(12) United States Patent
Helvoort et al.

(10) Patent No.: US 10,562,484 B2
(45) Date of Patent: Feb. 18, 2020

(54) BELT WEBBING FOR SAFETY BELT DEVICE AND SAFETY BELT DEVICE

(71) Applicant: AUTOLIV DEVELOPMENT AB, Vargarda (SE)

(72) Inventors: Chris Van Helvoort, Boxtel (NL); Richard Van Neer, Den Bosch (NL); Willi Welz, Veghel (NL); Kai-Stephan Mueller, Oelixdorf (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 15/524,954

(22) PCT Filed: Nov. 9, 2015

(86) PCT No.: PCT/EP2015/076029
§ 371 (c)(1),
(2) Date: May 5, 2017

(87) PCT Pub. No.: WO2016/071528
PCT Pub. Date: May 12, 2016

(65) Prior Publication Data
US 2017/0341621 A1    Nov. 30, 2017

(30) Foreign Application Priority Data

Nov. 6, 2014 (DE) .......................... 10 2014 222 654

(51) Int. Cl.
*B60R 22/14* (2006.01)
*D03D 1/00* (2006.01)
(Continued)

(52) U.S. Cl.
CPC .............. *B60R 22/14* (2013.01); *B60R 22/34* (2013.01); *D03D 1/0005* (2013.01); *B60R 21/18* (2013.01);
(Continued)

(58) Field of Classification Search
CPC .......... D03D 1/005; D03D 3/06; B60R 21/18; B60R 22/12; B60R 21/14
See application file for complete search history.

(56) References Cited

U.S. PATENT DOCUMENTS 3,888,503 A * 6/1975 Hamilton ................ B60R 21/18
280/733
4,400,013 A    8/1983 Imai
(Continued)

FOREIGN PATENT DOCUMENTS

DE    23 64 982 A1    7/1974
DE    31 19 177 A1    12/1982
(Continued)

OTHER PUBLICATIONS

Takeuchi, DE 10 0462681 A1 English Machine Translation, ip.com (Year: 2001).*
(Continued)

*Primary Examiner* — Karen Beck
(74) *Attorney, Agent, or Firm* — Brinks Gilson & Lione

(57) ABSTRACT

A belt webbing for a safety belt device of a motor vehicle, the belt webbing being wider in a first section than in a second section relative to its longitudinal direction.

13 Claims, 2 Drawing Sheets

(51) Int. Cl.
  *B60R 22/34* (2006.01)
  *B60R 21/18* (2006.01)
  *B60R 22/12* (2006.01)
  *B60R 22/18* (2006.01)

(52) U.S. Cl.
  CPC ........ *B60R 22/12* (2013.01); *B60R 2022/1806* (2013.01); *B60R 2022/3424* (2013.01)

(56) References Cited

U.S. PATENT DOCUMENTS

| | | | | |
|---|---|---|---|---|
| 4,600,626 A * | 7/1986 | Ogata | ............... | B60R 22/12 139/384 R |
| 5,465,999 A * | 11/1995 | Tanaka | ............... | A44B 11/2523 280/733 |
| 5,592,977 A * | 1/1997 | Kikuchi | ............... | D03D 1/0005 139/387 R |
| 5,634,499 A * | 6/1997 | Kikuchi | ............... | D03D 1/0005 139/387 R |
| 5,658,012 A * | 8/1997 | Villarreal | ............... | B60R 22/16 280/805 |
| 5,947,513 A * | 9/1999 | Lehto | ............... | B60R 21/18 280/730.1 |
| 6,419,263 B1 * | 7/2002 | Busgen | ............... | B60R 21/18 139/389 |
| 2002/0067031 A1 * | 6/2002 | Busgen | ............... | B60R 21/18 280/733 |
| 2002/0135175 A1 * | 9/2002 | Schroth | ............... | B60R 22/12 280/801.1 |
| 2003/0015863 A1 * | 1/2003 | Brown | ............... | A44B 11/2503 280/733 |
| 2004/0164532 A1 * | 8/2004 | Heidorn | ............... | B60R 21/18 280/733 |
| 2009/0051150 A1 * | 2/2009 | Murakami | ............... | B60R 21/18 280/733 |
| 2012/0165918 A1 * | 6/2012 | Du | ............... | A61F 2/06 623/1.15 |
| 2013/0190917 A1 * | 7/2013 | Cross | ............... | D06B 1/00 700/140 |
| 2013/0313811 A1 * | 11/2013 | Ichida | ............... | B60R 21/18 280/733 |
| 2014/0135906 A1 * | 5/2014 | Winner | ............... | D03D 3/02 623/1.51 |
| 2014/0151986 A1 * | 6/2014 | Kim | ............... | B60R 21/18 280/733 |
| 2014/0345743 A1 * | 11/2014 | He | ............... | D03D 3/02 139/384 R |
| 2015/0028575 A1 * | 1/2015 | Markusic | ............... | B60R 21/18 280/808 |
| 2017/0021141 A1 * | 1/2017 | Osbrink | ............... | A61M 25/10 |
| 2018/0043851 A1 * | 2/2018 | Lung | ............... | B60R 21/18 |

FOREIGN PATENT DOCUMENTS

| | | | | |
|---|---|---|---|---|
| DE | 33 28 738 A1 | | 2/1985 | |
| DE | 100 46 268 A1 | | 5/2001 | |
| DE | 102009058039 C5 | * | 2/2014 | ........... D03D 1/0005 |
| EP | 2666676 A1 | * | 11/2013 | ............. B60R 21/18 |
| FR | 3032462 A1 | * | 8/2016 | ................ D03D 3/06 |
| GB | 2096189 A | * | 10/1982 | ........... D03D 1/0005 |
| JP | S61111860 U | | 7/1986 | |
| WO | WO-2010069413 A1 | * | 6/2010 | ........... D03D 1/0005 |
| WO | WO-2013053790 A2 | * | 4/2013 | ............. B60R 22/12 |

OTHER PUBLICATIONS

G. Koch GB 2096159 Machine English Translation, ip.com (Year: 1982).*

International Search Report dated Jan. 28, 2016, of PCT/EP2015/076029.

* cited by examiner

BELT WEBBING FOR SAFETY BELT DEVICE AND SAFETY BELT DEVICE

CROSS-REFERENCE TO RELATED APPLICATIONS

This application is a 35 U.S.C. § 371 National Phase Application of PCT/EP2015/076029, filed Nov. 9, 2015, which claims the benefit of priority to German Patent Application Serial No.: DE 10 2014 222 654.6, filed Nov. 6, 2014, the contents of which are incorporated herein by reference in their entirety.

FIELD OF THE INVENTION

The invention relates to a seat belt webbing for a motor vehicle occupant protection seat belt system.

BACKGROUND

Safety belt devices and the belt webbing provided for them in general serve the purpose of restraining the occupants in a vehicular crash in order to reduce the risk of injury to the occupants.

Thereby one of the important criteria for the impact on the occupant in a case of being restrained is what is called the chest pressure of the occupant exerted by the diagonal shoulder belt section of the belt crossing the chest of the occupant. The chest pressure is caused by the composition and area of the unit surface of the diagonal shoulder belt webbing section and the tension exerted by the diagonal webbing section, which also depends on the characteristics of the occupant and the severity of the accident. Thereby the basic parameter for reducing the chest pressure is the unit surface of the diagonal webbing section.

Since the belt webbing must be windable on a seat belt retractor of the safety belt device, for which the width of the roll box for construction reasons cannot be as wide as one would wish, the unit surface can be increased only to a limited extent. In order to overcome this disadvantage, inflatable belt webbings have already been implemented, which are made as double layers and which can be expanded by a gas generator in an early phase of the accident into a thick "sausage" with an enlarged unit surface area.

The disadvantage of this solution is that the costs of the safety belt device increase because of the gas generator that is provided, and in addition the required structural room that is needed to fasten the safety belt device is significantly increased.

Against this background, the basic task for this invention is to provide a belt webbing and a safety belt device with which the impact pressure on the occupant can be reduced with simple means while avoiding the disadvantages noted here.

To resolve the task, according to the invention a belt webbing with the features described herein is provided.

According to a feature of the invention, it is proposed that the belt webbing in a first section be set up in a longitudinal direction wider than in a second section.

Implementing the proposed solution, the impact related pressure on the occupant alone can be reduced by the form of the belt webbing using very simple means, without having additional components being provided, such as a gas generator, or providing that the belt webbing does not have to be specially woven for expansion. The position of the wider first section is thereby intentionally so chosen that when this section, with the seatbelt attached, reaches one part of the occupant, the impact related pressure on the occupant is reduced.

In addition, the solution of the task of a safety belt device with the features described herein is proposed in which according to the basic idea of the invention a belt webbing according the invention is planned, and for which a second seatbelt retractor is may be implemented on which the belt webbing can be rolled up with a second end.

Through the proposed solution, the impact related pressure on part of the occupant can be reduced, in which the first section of the belt webbing reaches the unit, whereby the second belt roller makes it possible that the belt webbing is completely rolled up exclusively with the second narrower section.

The second webbing section preferentially has a width of for example, about 46 mm to 48 mm, as is customary with standard safety belt devices. Thereby the belt webbing with the second section can be rolled up with a standard seatbelt retractor. If two seatbelt retractors are used, it is also possible to position the first section so that for a complete rolling up of the belt webbing it does not have to be rolled up on one of the seatbelt retractors, and as a result the belt webbing, despite the greater width of the first section, can always be completely rolled up, and in particular in the parked position can hang down with the smallest possible attachment to the vehicle structure.

Particularly good results in reducing the impact on the occupant can be achieved while at the same time achieving good wearing comfort, in that the first section has a width of about 75 mm to 100 mm, whereby the first section also preferentially should be about 350 mm to 600 mm long.

In addition, the belt webbing in the first section can preferentially have a 1/1 and/or a 2/2 binding, whereby the belt webbing in the wide unit section of the first section has very thick attachment points between the warp threads and the weft threads. Thereby a very even distribution of the impact over the belt webbing is achieved.

In particular a very good impact distribution can be achieved if the belt webbing in the first section has 10 to 18 weft threads/cm.

In addition, a very homogeneous impact distribution results if the belt webbing set up between the second and the first section has a transitional section with an increasing number of weft threads/cm of 6 to 18 weft threads/cm.

It is further proposed that the belt webbing between the second and the first section have a transitional section with increasing width in the direction of the first section with a length of 100 mm to 200 mm. Through the proposed transitional area and its dimensioning, the impact force distribution on the belt webbing and on the restrained occupant can be equalized, so that as a result the reduction of the occupant impact related pressure by the first section does not lead to a sudden increase of the occupant impact related pressure in the transition to the second section. It is further proposed that the belt webbing in the first section be woven in two layers lying over one another, and that the two layers be connected with one another by a binding thread. Through the proposed solution, a very smooth appearance can be achieved without visible holes. In addition, thereby the tendency to create a fold or an arch of the belt webbing in the area of the first section can be prevented.

In addition, with regard to avoiding the tendency to a fold or an arch, the seatbelt can be simply designed by having the warp threads of the belt webbing woven in at least 3 weaving beams and preferentially in 4 weaving beams. By interweaving the warp threads in different weaving beams, the belt webbing can be provided with specific features in various zones, which give specific features to the seatbelt in the horizontal direction, such as heightened stiffness.

Thereby a tendency for arching or folding can be efficiently prevented if the belt webbing is woven in a central first weaving beam with a first amount of warp threads, and with the bordering second and third weaving beams next to the central first weaving beam woven with a second number of warp threads, which is smaller than the first number of warp threads in the first weaving beam.

It is further proposed that the second and third weaving beams be formed identically and arranged to the central first weaving beam, whereby the belt webbing has identical features on both sides of the central section. Thereby there is no preferred side that tends to arch or fold up under impact. Furthermore, the belt webbing on both sides has the same features, so that the belt webbing may also lie twisted on the occupant without thereby changing the restraining characteristics.

Especially good results can be achieved with a belt webbing that in the first central weaving beam has 100 to 140 warp threads, preferentially 120 warp threads, and/or 70 to 80 warp threads in the second and third weaving beams, preferentially 75 warp threads.

It is further proposed that the binding thread be woven in a weaving beam separate from the other warp threads, whereby the binding thread can be woven intentionally with another connection other than the remaining warp threads with the weft threads. In particular it is thereby possible very simply to connect the two layers of the belt webbing with each other.

In particular a lockable belt tongue can be provided on the belt webbing that is made movable in a vehicle attachable belt lock, which divides the belt webbing into a locked position in a diagonal shoulder belt webbing section crossing the chest of an occupant and a lap belt webbing section crossing the hips of the occupant, and the first section is so dimensioned and positioned that it forms the diagonal webbing section or a portion of the diagonal webbing section. The chest pressure of the diagonal webbing section can in particular be reduced by the proposed solution. Since the hips of the occupant bear a much greater load, for reasons of a risk of injury it is unjustifiable to set the belt webbing here with a standard width; the lap belt webbing section is accordingly formed by the second narrower section of the belt webbing, and can be rolled up on the second belt roller or the first belt roller.

BRIEF DESCRIPTION OF THE DRAWINGS

The invention is discussed below based on preferred embodiments with reference to the attached figures. These show.

DETAILED DESCRIPTION

Figure 1:
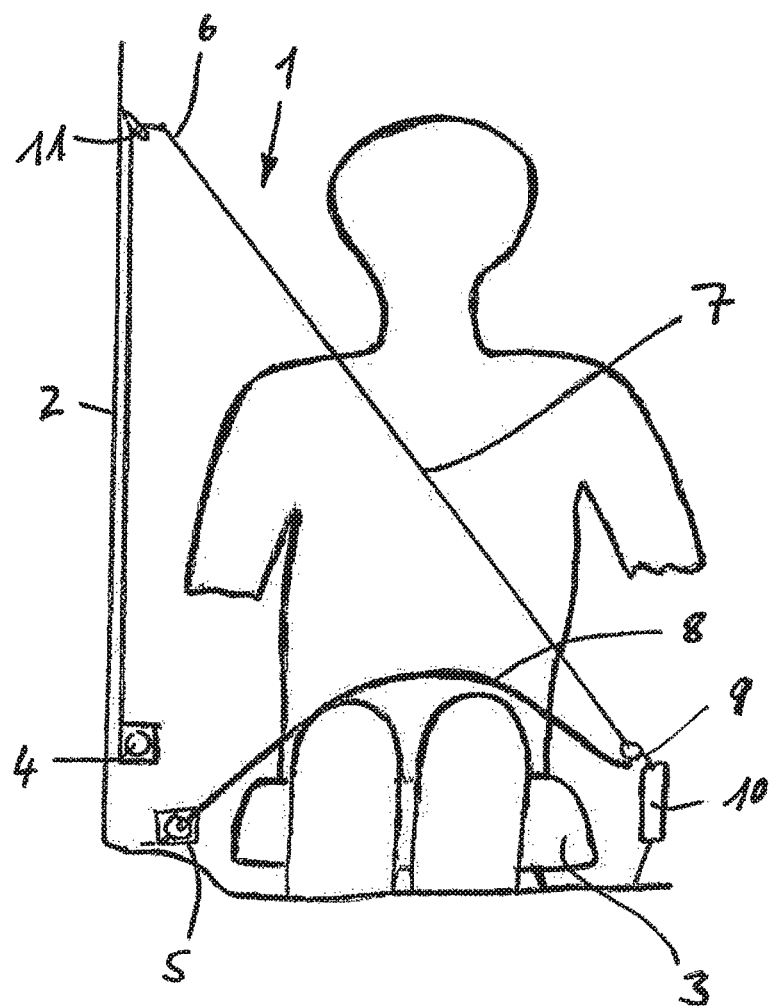
FIG. 1: a safety belt device with a belt webbing according to the invention.

In FIG. 1, a seat belt device 1 according to the invention may be seen with an occupant sitting on a vehicle seat 3. The seat belt device 1 is comprised of a first belt retractor 4 and a guide loop 11, both of which are fastened to a B-column 2 of a vehicle. In addition, the seat belt device 1 includes a second belt retractor 5 and a belt buckle 10, both of which are fastened to a lower section of the vehicle structure, preferably to the floor structure of the vehicle. In addition, a belt webbing 6 is planned on which a movable belt tongue 9 is provided, which is locked into the belt buckle 10. The belt tongue 9 divides the belt webbing 6 in locked position into a diagonal shoulder belt webbing section 7 crossing the chest of the occupant and a lap belt webbing section 8 crossing the hips of the occupant.

The belt webbing 6 is windable with a first end on the first belt retractor 4 and runs from there up to the guide loop 11. Starting from the guide loop 11, the belt webbing 6 runs further in the diagonal shoulder belt webbing section 7 up to the belt tongue 9 that is locked into the belt retractor 10 and further from the belt tongue 9 into the lap belt webbing section 8 to the second belt retractor 5, onto which the belt webbing 6 is windable with a second end. To this point the seatbelt belt device 1 corresponds to the geometry of a standard 3-point safety belt device with two belt retractors 4 and 5.

Figure 2:
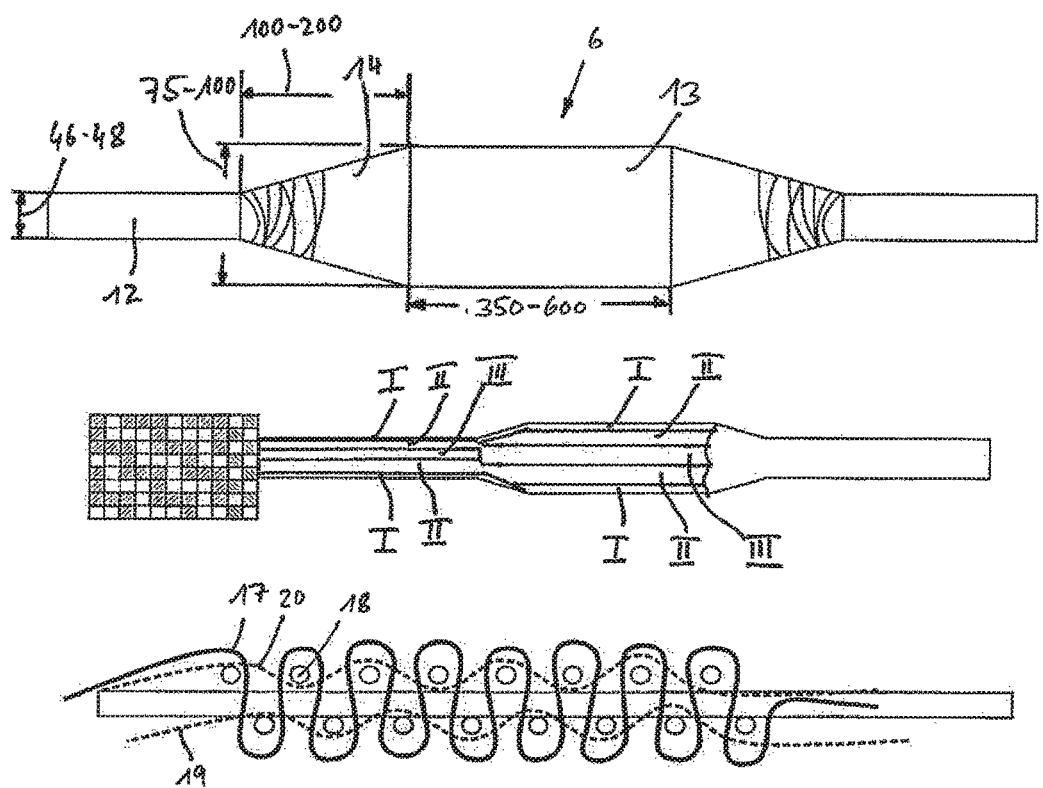
FIG. 2: the belt webbing with a first broadened section in various views.

A section of the belt webbing 6, preferentially a section of the diagonal shoulder belt webbing section 7, can be seen enlarged in FIG. 2. The belt webbing 6 has at least a first section 13, a second section 12, and in each case a transitional section 14 arranged between the two sections 12 and 13. The second section 12 has a width for example of about 46 mm to 48 mm, which corresponds to the width of standard belt webbing. Since the belt webbing 6 is in each case windable with the first end and the second end onto the two belt retractors 4 and 5, which correspond to the second sections 12 of the belt webbing 6, standard belt retractors 4 and 5 with standard dimensions and construction measures can also be used. On the other hand, the first section 13 of the belt webbing has a width of for example about 75 mm to 100 mm and is about 350 mm to 600 mm long. Furthermore, a transitional section 14 is planned in each case between the first section 13 and the second section 12, in which the width of the belt webbing 6 increases in the direction of the first section 13. The transitional section 14 in each case has for example a preferred length of 100 mm to 200 mm. The first section 13 is so positioned in the belt webbing 6 that when the belt webbing 6 is attached, it lies on the chest of the occupant. In addition, the first section 13 is so positioned and the second section 12 is so dimensioned lengthwise that the belt webbing 6, when unfastened, is rolled up into a complete rollup exclusively with the second section 12 with the smaller width onto both the belt retractors 4 and 5. Thereby the length of the second section 12 is so dimensioned that the belt webbing 6 is rolled to its maximum position over the first belt retractor 4 until it lies on the guide loop 11 with a transitional section 14 or the first section 13. The remaining webbing section is thereby rolled up in that the second end of the belt webbing 6 is rolled up onto the second belt roller 5. Thereby the belt webbing 6 in practice is rolled up over the two free ends of the diagonal shoulder belt webbing section 7 and the lap belt webbing section 8.

The advantage of the proposed solution may be seen in the fact that the surface area of this belt webbing 6 gets larger in the area of the first section 13, and the load over unit area (pressure) is thereby reduced on the occupant. Thereby it is especially advantageous that the belt webbing 6 is set in both the windup second sections 12 or the two ends with standard sizes, so that standard belt retractors 4 and 5 can be used, and that the belt webbing 6 must not be rolled up to a complete rollup with the first sections 13. The position of the first section 13 must thereby be so set that it always lies both in the parked position of an unfastened seat belt webbing 6 and in the fastened belt webbing 6 position between the guide loop 11 and the belt tongue 9 without the belt webbing unbuckling movement and belt webbing buckling movement being disturbed, something made possible by the use of two belt retractors 4 and 5.

The belt webbing 6 in the first webbing section 13 has a weft thread thickness preferably of 10 to 18 weft thread/cm, in the second section 12, a weft thread thickness preferably of about 6 to 12 weft threads/cm, and in the transitional sections 14 an increasing weft thread thickness of 6 to 18 weft thread/cm in the direction of the first section 13. The thickness of the weft threads in each case is given in the direction of the longitudinal extension of the belt webbing 6.

Figure 3:
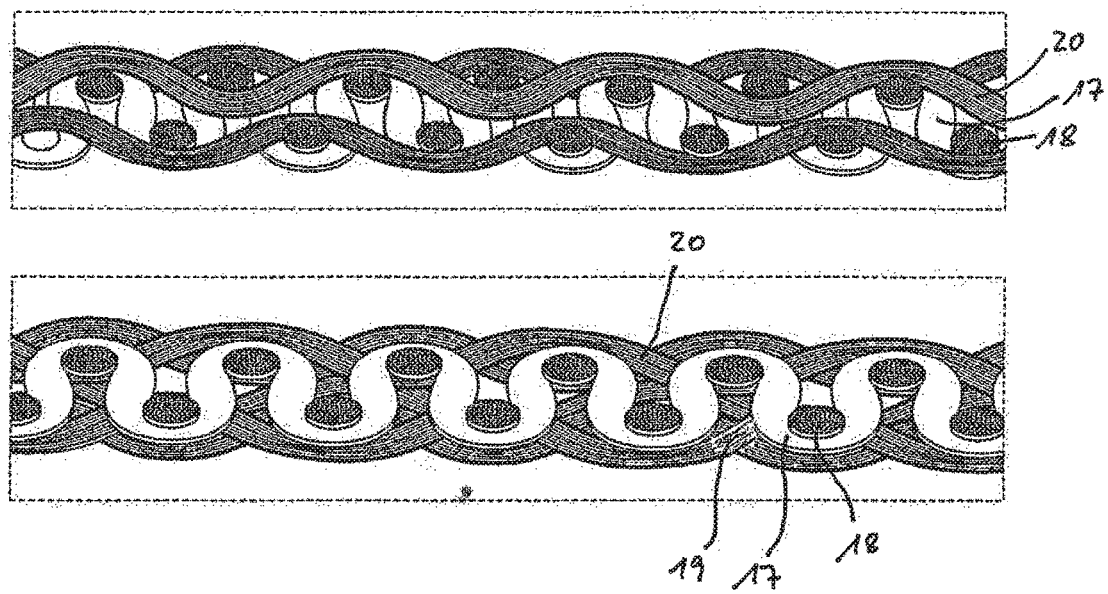
FIG. 3: two different cross-sections parallel to the lengthwise stretch by the weft threads of the first section of the belt webbing.

Furthermore, the belt webbing 6 in the area of the second section 12 and in the area of the transitional section 14 in each case is woven with a 2/2 binding, and in the area of the first section 13 with a 1/1 and/or a 2/2 binding. As is recognizable in the presentation of FIG. 2 and FIG. 3, the belt webbing 6 in the area of the first section 13 is double layered woven with two layers on warp threads 19, 20 and weft threads 18, whereby both layers and in particular the weft threads 18 in the edge areas in each case are bound by two binding threads 17 in a 1/1 binding, while the standard warp threads 19, 20 may also be woven in a 2/2 binding as well as in a 1/1 binding. Thereby it is shown to be advantageous if only the binding threads 17 are woven in a 1/1 binding and the warp threads in a 2/2 binding. The first section 13 is thereby formed as a hollow fabric.

The advantage of the proposed formation of the first section 13 in the transitional section 14 may be seen in the fact that the belt webbing 6 during normal use and when under impact lies against the occupant without folds and without arching in the edge areas. Thereby the length of the transitional sections 14 and the increasing thickness of the weft threads in the transitional sections 14 are of special importance for a distribution of impact forces as uniform as possible. In addition, the type of weave of the 1/1 and/or 2/2 binding in the area of the first section 13 is of special importance, because hereby a very thick and high number of binding points of the weft threads 18, warp threads 19, 20 and binding threads 17 can be achieved.

The warp threads 19/20 have a thread strength of 830 to 1670 dtex, while the weft threads 18 have a preferred thread strength of 400 to 1100 dtex and the binding threads 17, a preferred thread strength of 280 to 550 dtex. Thereby the thread strengths of the binding threads 17 can be chosen depending on the thread strength of the weft threads 18.

In addition, the belt webbing 6 with warp threads 19, 20 may be woven with an individually changeable or variable tension for the various sections 12, 13, and 14.

As recognizable in the central illustration of FIG. 2, the warp threads 19, 20 of the belt webbing 6 are woven in three weaving beams I, II, and III. Thereby the first weaving beam III in the central section has 150 warp threads, while on the first weaving beam III two symmetrically arranged and identically formed partial bundles or partial sections of a second weaving beam II are on the edge, which in comparison to the first weaving beam III have a smaller number of in each case 75 warp threads each, so that the second weaving beam II also has altogether the sum of the two partial bundles or partial sections 150 warp threads 19 and 20. Two additional partial sections or partial bundles of a third weaving beam I border on the outside, which in each case have 60 warp threads, so that the third weaving beam I has a total of 120 warp threads 19, 20. The warp threads 19, 20 of the various weaving beams I, II, and III can preferentially be woven in various bindings and/or in various orientations with the weft threads 18, so that the belt webbing 6 has various bindings of the weft threads 18 along its length.

Due to the interweaving of the warp threads 19, 20 in various weaving beams I, II, and III, the belt webbing 6 can intentionally be provided in the first section 13 with such stiffness in the cross direction that the belt webbing 6 is not arched to the side even with increased length forces in the side edge sections. Thereby the weaving in the various weaving beams I, II, and III is further preferred because of the advantage that the higher tensile strength in the narrower second section 12 is thereby transferred more evenly to the first section 13 and vice versa. The individual groups of warp threads 19, 20 are understood under the concept of weaving beams I, II, and III 19, 20, which together change their side orientation to the weft threads 18 and thereby are interwoven into a uniform binding with the weft threads 18.

Because of the interweaving of the warp threads 19 and 20 in various weaving beams I, II, and III, the bindings of the warp threads 19 and 20 can be selected individually in various groups across the lengthwise extension of the belt webbing 6, whereby again various stiffness of the belt webbing 6 can be achieved or prevented and whereby intentionally a specific deformation behavior of the belt traps 6 can be achieved or prevented.

The binding thread 17 is preferentially in a separate fourth weaving beam, not illustrated, woven over the entire horizontal stretch of the belt webbing 6 and a 1/1 binding with the weft threads 18, so that the binding thread 17 is woven in a different binding than the warp threads 19, 20 of the other weaving beams I, II, and III, and thereby both layers of the warp threads 19 and 20 are bound to each other. The fourth weaving beam of the binding thread 18 in practice overlays the other weaving beams I, II, III over the horizontal stretch of the belt webbing 6 and preferentially comprises 70 to 120 threads and especially preferentially 100 threads.

Groups of warp threads 19, 20 or of the binding thread 17 are understood as weaving beams I, II, III, which are woven together as groups in a binding with the weft threads 18. Thereby the binding can be formed in the rhythm differently or identically in the rhythm, but formed in an offset fashion. The partial section or partial bundle of the second and third weaving beams II and I are set and distributed preferentially symmetrically to the first weaving beam III and interwoven in a uniform 2/2 or 1/1 binding with the weft threads 18, preferentially with a 2/2 binding.

The invention claimed is:

1. A seat belt webbing for a safety belt device of a motor vehicle, comprising;
   the belt webbing is formed having a first section wider in its lengthwise orientation than in a second section, the belt webbing in the first section has 10 to 18 weft threads/cm, the belt webbing in the second section has 6 to 12 weft threads/cm, and
   the belt webbing has a transitional section between the first section and the second section with 6 to 18 weft threads/cm between the second section and the first section with an increasing number of weft threads/cm in a direction of the first section.

2. A seat belt webbing according to claim 1, further comprising in that the first section has a width of 75 to 100 mm.

3. A seat belt webbing according to claim 1, further comprising in that the first section has a length of 350 to 600 mm.

4. A seat belt webbing according to claim 1, further comprising in that the belt webbing in the first section has a 1/1 or a 2/2 binding.

5. A seat belt webbing according to claim 1, further comprising in that the belt webbing is woven in the first section into two layers arranged above one another, and the two layers are attached to one another by a connecting thread.

6. A seat belt webbing according to claim 1, further comprising a plurality of warp threads of the belt webbing are woven in at least three weaving beams including a first beam, a pair of second beams, and a pair of third beams.

7. A seat belt webbing according to claim 6, further comprising in that the belt webbing with the first weaving beam at a longitudinal center area of the webbing with a first number of warp threads, and the belt webbing is woven in partial sections of the pair of second beams and the pair of third weaving beams bordering on the first weaving beam with each of the partial sections having a second number of warp threads which is smaller than the first number of warp threads in the first weaving beam.

8. A seat belt webbing according to claim 7, further comprising in that the pair of second and the third weaving beams are formed identically and arranged symmetrically to the first weaving beam.

9. A seat belt webbing for a safety belt device of a motor vehicle, comprising;
the belt webbing is formed having a first section wider in its lengthwise orientation than in a second section,
a plurality of warp threads of the belt webbing are woven in at least three weaving beams including a first beam, a pair of second beams, and a pair of third beams,
the belt webbing with the first weaving beam at a longitudinal center area of the webbing with a first number of warp threads, and the belt webbing is woven in partial sections of the pair of second and third weaving beams bordering on the first weaving beam with each of the partial sections having a second number of warp threads, which is smaller than the first number of warp threads in the first weaving beam,
the belt webbing has 140 to 160 warp threads in the first weaving beam.

10. A seat belt webbing for a safety belt device of a motor vehicle, comprising;
the belt webbing is formed having a first section wider in its lengthwise orientation than in a second section,
a plurality of warp threads of the belt webbing are woven in at least three weaving beams including a first beam, a pair of second beams, and a pair of third beams,
the belt webbing has 120 to 150 warp threads in each of the pairs of second and third weaving beams, and
the belt webbing with the first weaving beam at a longitudinal center area of the webbing with a first number of warp threads, and the belt webbing is woven in partial sections of the pairs of second and third weaving beams bordering on the first weaving beam with each of the second and third pairs of weaving beams having a second number of total warp threads, which is smaller than the first number of warp threads in the first weaving beam.

11. A seat belt webbing for a safety belt device of a motor vehicle, comprising;
the belt webbing is formed having a first section wider in its lengthwise orientation than in a second section,
the belt webbing is woven in the first section into two layers arranged above one another, and the two layers are attached to one another by a connecting thread,
the connecting thread is woven in a weaving beam separate from that of other of a plurality of warp threads.

12. A seat belt webbing according to claim 1, further comprising in that a movable and lockable belt tongue is provided on the belt webbing in a fastenable vehicle belt buckle, which
distributes the belt webbing in a locked position to a diagonal shoulder belt webbing section across the chest of an occupant and a lap belt webbing section crossing the hips of the occupant, and
the first section is dimensioned and positioned that it forms the shoulder belt webbing section or a portion of the shoulder belt webbing section.

13. A safety belt device comprising
a first webbing retractor, and
the belt webbing being windable with a first end connected to the first webbing retractor,
the belt webbing is formed according to claim 1, and
a second webbing retractor is provided onto which the belt webbing is windable at a second end.

* * * * *